US008028150B2

(12) United States Patent
Rakib et al.

(10) Patent No.: US 8,028,150 B2
(45) Date of Patent: Sep. 27, 2011

(54) RUNTIME INSTRUCTION DECODING MODIFICATION IN A MULTI-PROCESSING ARRAY

(76) Inventors: Shlomo Selim Rakib, Cupertino, CA (US); Yoram Zarai, San Jose, CA (US)

(*) Notice: Subject to any disclaimer, the term of this patent is extended or adjusted under 35 U.S.C. 154(b) by 900 days.

(21) Appl. No.: 11/941,847

(22) Filed: Nov. 16, 2007

(65) Prior Publication Data

US 2009/0132787 A1    May 21, 2009

(51) Int. Cl.
*G06F 15/76* (2006.01)
*G06F 15/80* (2006.01)
(52) U.S. Cl. ............................................ 712/16; 712/22
(58) Field of Classification Search .................... 712/16, 712/22
See application file for complete search history.

(56) References Cited

U.S. PATENT DOCUMENTS

| 6,006,318 A | 12/1999 | Hansen et al. |
| 2003/0088754 A1* | 5/2003 | Barry et al. ..................... 712/11 |
| 2003/0140211 A1* | 7/2003 | Stein et al. ...................... 712/15 |
| 2004/0010321 A1* | 1/2004 | Morishita et al. ................. 700/2 |
| 2007/0050603 A1 | 3/2007 | Vorbach et al. |
| 2007/0130444 A1 | 6/2007 | Mitu et al. |
| 2007/0250688 A1* | 10/2007 | Kyou ............................ 712/215 |

* cited by examiner

*Primary Examiner* — Daniel Pan
(74) *Attorney, Agent, or Firm* — Stephen E. Zweig

(57) ABSTRACT

A method and system for decoding and modifying processor instructions in runtime according to certain rules in order to separately control processing elements embedded within a multi-processor array using a single instruction. The present invention allows multiple processing elements and/or execution units in a multi-processor array to perform different operations, based upon a variable or variables such as their location in the multi-processor array, while accepting a single instruction as an input.

20 Claims, 4 Drawing Sheets

RUNTIME INSTRUCTION DECODING MODIFICATION IN A MULTI-PROCESSING ARRAY

FIELD OF THE INVENTION

The present invention relates generally to multi-processor array for executing instructions, and more particularly to runtime processor instructions decoding modification to control the multi-processor array.

BACKGROUND OF THE INVENTION

The present invention allows instruction code reduction since one instruction can result in many different operations. Also, as a lot of mathematic algorithms (especially vector and/or matrix arithmetic) rely on topology (location) of each element in the vector/matrix, the invention allows very efficient execution of numerical algorithms. Several other advantages of the present invention over existing arts include, power saving: in cases where not all the PEs are required, a NOP modifier can be used to shut them down, saving power consumption;

non-SIMD based algorithms: in cases where the underlying algorithm is not a pure SIMD algorithm (for example, a filter operation or a transform operation), a SIMD implementation will not be efficient. Using the PE-grouping method provides much more flexibility, which results in a more efficient implementation;

multiple data set operations: in cases where the underlying algorithm operates on a data set smaller than the size of the PE-array, some of the PEs will not be utilize and the efficiency of the implementation will be low (consider a 2×2 matrix multiply on a 4×4 PE array). Using the PE-grouping method allows the implementation on multiple data set in parallel (four 2×2 matrix multiply executing at the same time);

unaligned loading: allowing a construction of non-align data elements (from memory) to be loaded to the same register (for example, register "r0") of the PE-array, the PE-grouping method can be used to load multiple consecutive data elements (for example, two consecutive data element vectors: [v0, v1, . . . , v15] and [u0, u1, . . . , u15]) such that a subset is store in the same register (using the operand modifiers, for example, first half of the V vector is saved in r0, second half in r1, first half of the U vector in r1 and second in r0. This will result in the elements [v8, v9, . . . , v15, u0, u1, . . . , u7] stored in r1 register).

SUMMARY OF THE INVENTION

A method and system for decoding and modifying processor instructions in runtime according to certain rules in order to separately control processing elements embedded within a multi-processor array using a single instruction. The present invention allows multiple processing elements in a multi-processor array to perform different operations, based upon a variable or variables such as their location in the multi-processor array, while accepting a single instruction as an input.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
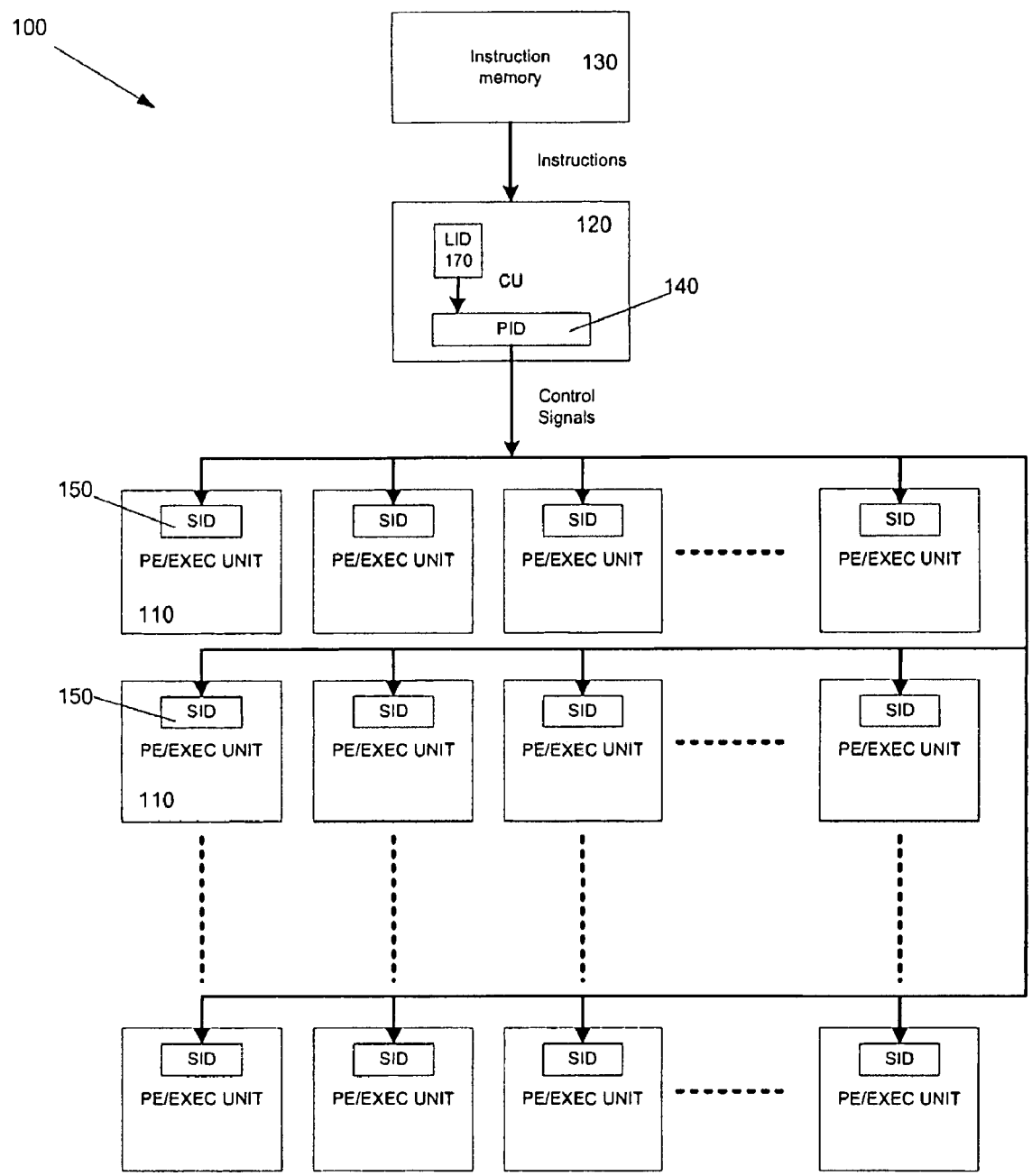
FIG. 1 illustrates a first embodiment of the present invention.

One embodiment of the present invention is illustrated in FIG. 1. A Multi-Processor array 100 includes several independent and separate Processing Elements (PE) 110, that are connected to a central Control Unit (CU) 120. The CU accepts instructions from the instruction memory 130 and then distributes control signals to each PE 110 according to the instructions. A Primary Instruction Decoder (PID) 140 located in the CU 120 decodes the instruction supplied to the CU 120, and a Secondary Instruction Decoder (SID) 150 located in each PE 110 decodes control signals distributed from the PID 140. The SID 150 modifies the control signals based on the location of the corresponding PE, in the multi-processing array. In another embodiment, not shown, the SID's 150 are each located within the central control unit 120, rather than in the corresponding PE 110, though the complexity of this embodiment is substantially increased, since in order for the distribution of control signal to occur within required periods, the CU 120 needs to perform the SID 150 operations in parallel.

It is also understood that the PID 140 performs the decoding according to PE location. Meaning, each PE 110 gets its own modification signals based on its location (which group it belongs to) from the PID 140. Then, SID 150 performs the modification decoding (for example, it get the original instruction and an inverse operation modification signal, which tell it to inverse the operation). SID 150 does not preferably deal with the PE location any more, since this was handled by PID 140. So, again, PID 140 gets the instruction from instruction memory and looks at the Location ID Register, which indicates to the PID 140 to which group each PE belongs and what are the modifications per group. Then, PID 140 sends the relevant modification signals to each PE 110 based on its group. SID 150 then performs the modifications to its operation, source operands and destination operands and executes the (modified) instruction. As an example, assume that PE3 belongs to Group 1. The Location ID register also specifies the modification (operation and operands) for each group (lets assume there are 3 groups—meaning there are 3 sets of modifiers, one for each group). In that case, PID 140 will send to PE3's SID 150 only the modifiers (operation and operands) relevant to Group 1 (one of the 3 modifiers set). All the SID 150 needs to do is to perform the relevant modification (inverse of the operation, for example) and execute the (modified) instruction.

Figure 2:
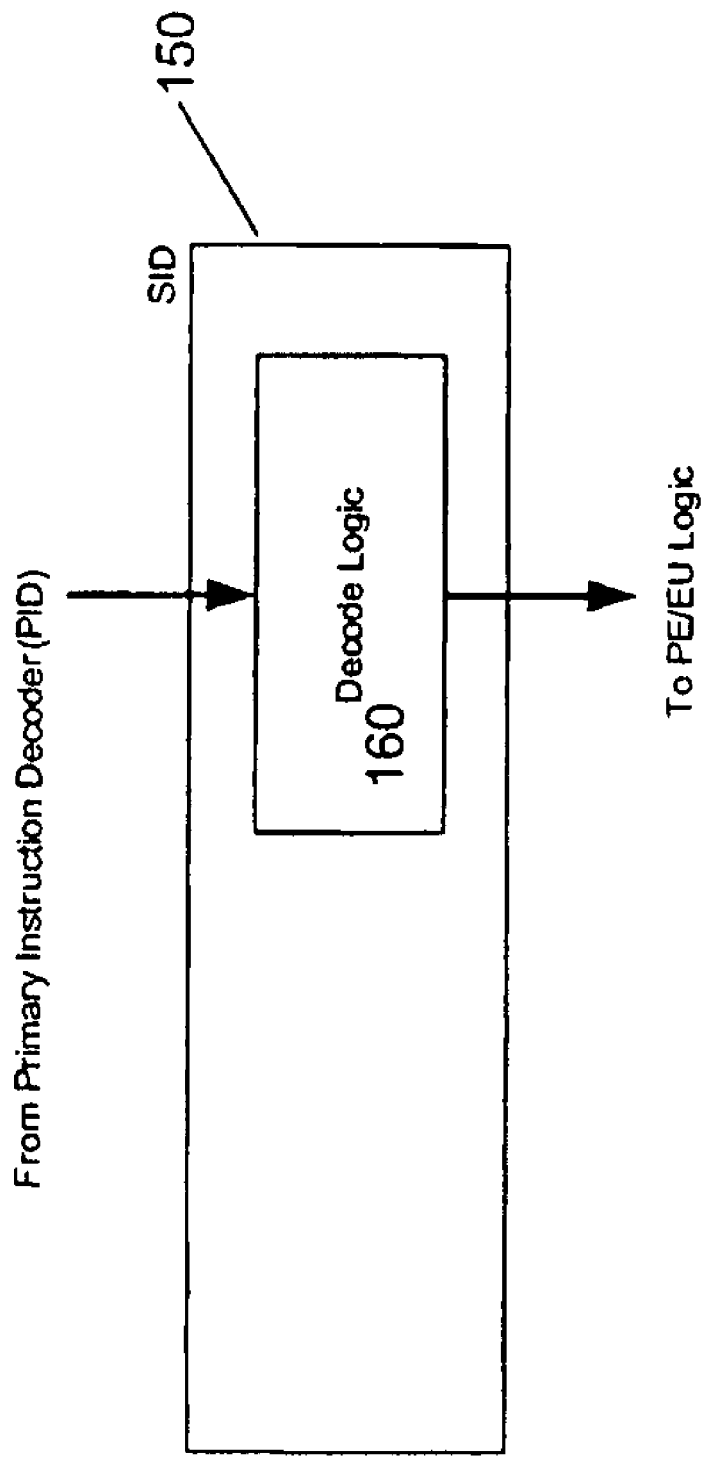
FIG. 2 illustrates a secondary instruction decoder according to the present invention.

The Primary Instruction Decoder (PID) 140 performs a first level instruction decoding using the instructions fetched form Instruction Memory 130 to the CU 120 and generates control signals, which in turn are fed to all of the PE 110 collection. Each PE110 contains a Secondary Instruction Decoder (SID) 150, which consists of decode logic 160, as shown in FIG. 2. The location ID resides in PID 140.

The Location ID Register 170 holds identifying information that uniquely identifies each PE 110 to which group it belongs to, together with modification information per group (meaning, how to modify the operation, source operands and destination operands for each group). This grouping identity can be generated according to location within the array (a special instruction, which defines the grouping at run-time), some serial ID, or any other identification method. The modification information can also be generated at run-time using an instruction. Based on the content of the Location ID Register, the PID sends the modification signals to each PE, based on which group it belongs to (together with the original instruction). Thus, the same instruction supplying form the PID 140 to all PE collection can be understood differently by each PE, according to the modification signals that PID 140 sends to each PE, and as a result, each PE 110 can react differently to the same instruction. For example, an ADD instruction can be interpreted as ADD by some PEs and SUBTRACT by some other PEs.

Table 1 below shows an example of opcode (operation) modifier where the first column shows the original opcodes, and the second column shows the modified opcodes, which in this case is the complement of the original. The PE executes the "original opcode" or the "modified opcode" or performs a "no-operation" according to the modification signals. For example, when receiving an ADD/ADDU instruction from PID 140, the PE will perform an ADD/ADDU operation if the modification signals indicate "original opcode", a SUB/SUBU operation if "modified opcode", and no operation if "no-op". Table 2 below shows an example of single register operand modifier, where the first column shows the original operand, the second column shows modification 1, the third column shows modification 2, and the last column shows modification 3. For example, suppose that the original instruction asks for R7 as the operand, the PE will locate R7 if the modification signals indicate "original operand", R6 if "modification 1," R5 if "modification 2," and R4 if "modification 3".

Figure 4:
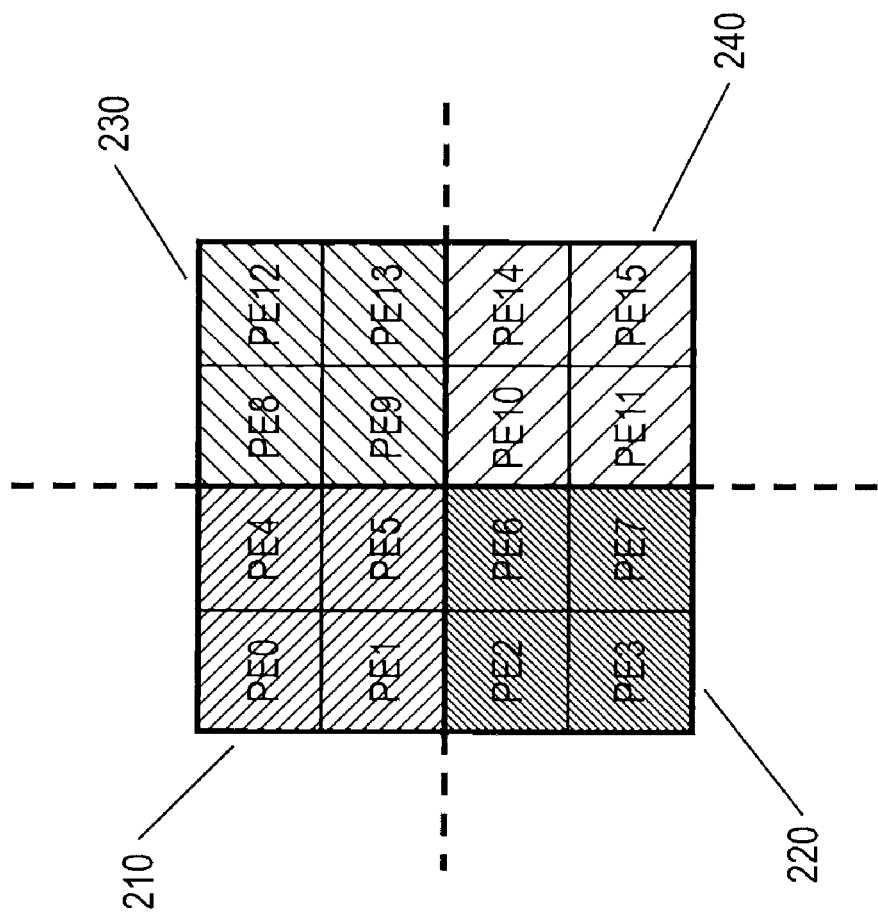
FIGS. 3 and 4 illustrate an example implementation according to the present invention.
Figure 3:
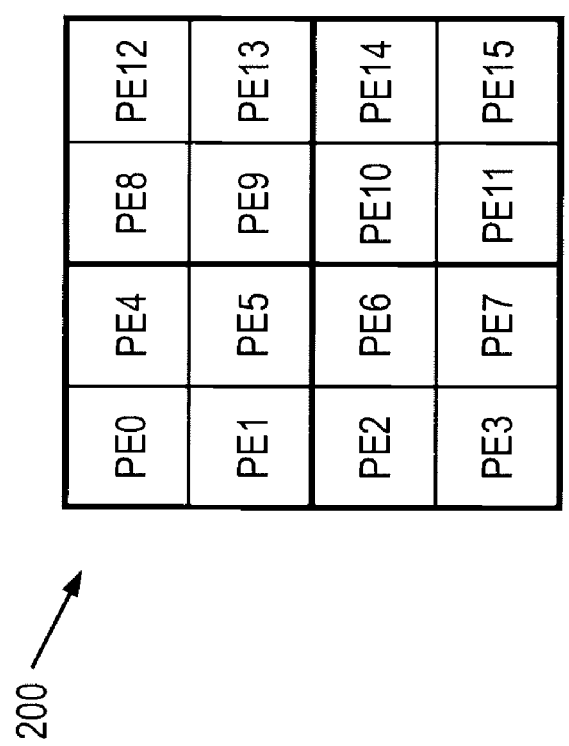

One example implementation of the present invention is shown in FIG. 3, where the CU 120 is omitted from this drawing for clarity. The system 100 contains 16 Processing Elements (PE) 110, arranged as a 4×4 matrix 200. Here, it is assumed that the 4×4 PE matrix 200 is divided into 4 groups of 2×2 PE matrix 210, 220, 230, 240, by writing proper information into the Location ID Register 170, as shown in FIG. 4. It should be noted that the matrix dimension and the divided group amount applied here are for illustration purposes, and it should be clear that any dimension and groups amount applicable can be applied to matrix 200.

Suppose an ADD instruction "ADD R0, R1, R2" is fed from the CU 120 to the entire PE matrix 200. The original ADD instruction "ADD R0, R1, R2" performs the operation: R0→R1+R2, where the values stored in R1 and R2 are added together, and the resulting value is stored in R0 register. However, based upon the decode logic in each SID, (as described above in Table 1 and 2,) every PE can interpret the instruction differently. A possible parameter implementation of Location ID Register 170 can provide the following functionality: group 210 performs R0←R1+R2, group 220 performs R0←R131 R2, group 230 performs R3←R2−R1, and group 240 performs no-operation. All four different operations are resulted from the same original instruction.

Below is the Opcode (operation) modification Table 1:

TABLE 1

| Opcode Modifiers | |
|---|---|
| Original Opcode | Modified Opcode |
| or | nor |
| and | nand |
| add | sub |
| sub | add |
| max | min |
| min | max |

Below is Table 2 which describe the operands modifiers:

TABLE 2

| Single Registers operand modifiers | | | |
|---|---|---|---|
| Original Operand | Modification 1 | Modification 2 | Modification 3 |
| R0 | R1 | R2 | R3 |
| R1 | R0 | R3 | R2 |
| R2 | R3 | R0 | R1 |
| R3 | R2 | R1 | R0 |
| R4 | R5 | R6 | R7 |
| R5 | R4 | R7 | R6 |
| R6 | R7 | R4 | R5 |
| R7 | R6 | R5 | R4 |
| XN0 | XS0 | XE0 | XW0 |
| XS0 | XN0 | XW0 | XE0 |
| XE0 | XW0 | XS0 | XN0 |
| XW0 | XE0 | XN0 | XS0 |
| XN1 | XS1 | XE1 | XW1 |
| XS1 | XN1 | XW1 | XE1 |
| XE1 | XW1 | XS1 | XN1 |
| XW1 | XE1 | XN1 | XS1 |

The different types of grouping are, in general, derived from the underlying algorithms. As an example, we can consider a Hadamard transform algorithm, which uses as its basic operations an addition and subtraction operations. If we consider a 4×4 two-dimensional Hadamard transform implemented on a 4×4 PE array, then, due to the 4×4 Hadamard matrix, we will have to define both rows and columns grouping (some parts of the algorithm will use rows grouping while other parts will use columns grouping).

As another example, we can consider four 2×2 matrices multiply implemented on the same 4×4 PE array. In order to implement the four matrices multiply in parallel, a quadrant-corner grouping is needed as illustrated in the FIG. 5.

Figure 5:
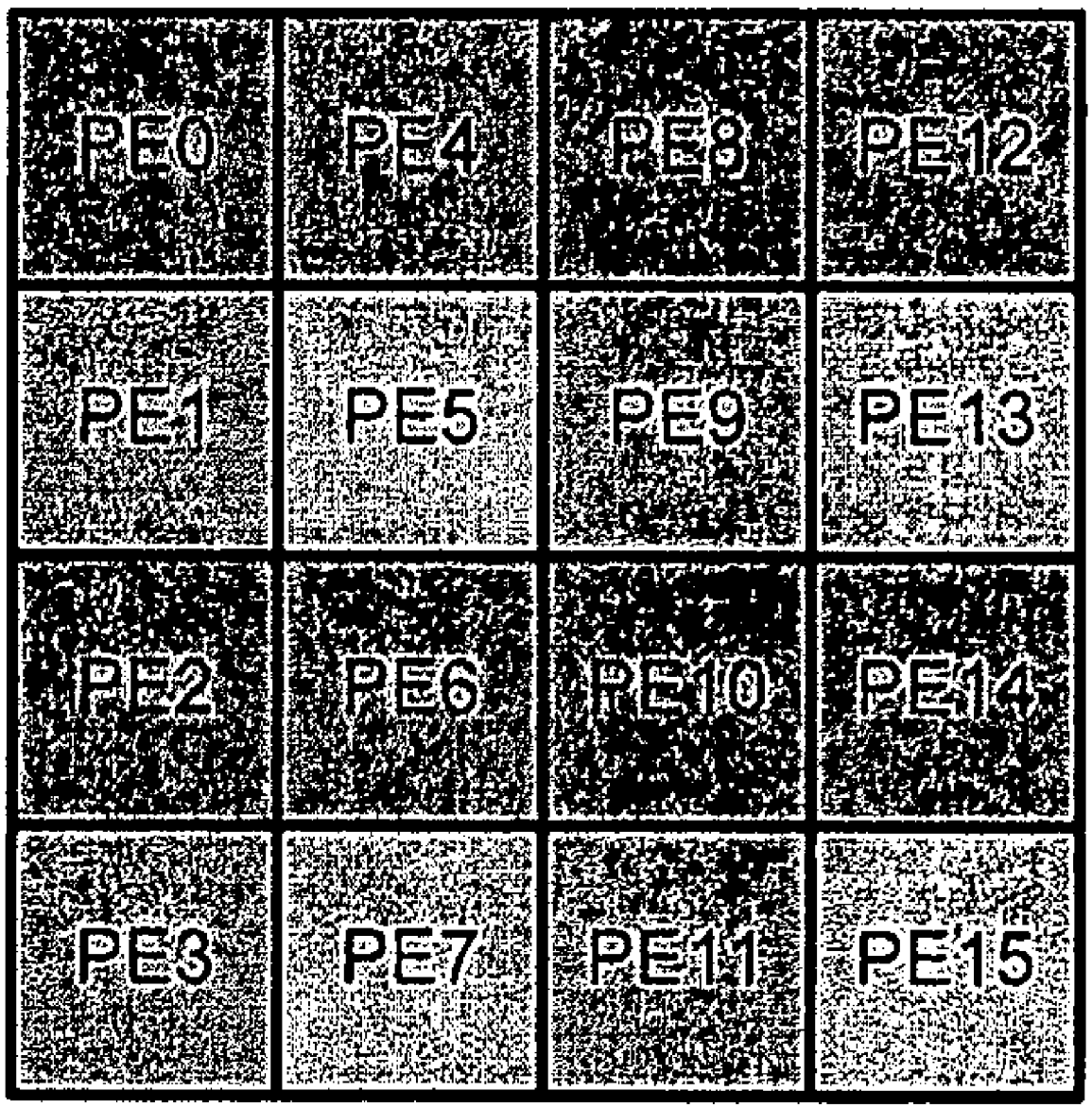
FIG. 5 illustrates an example of four quadrants grouping according to the present invention.

In general, grouping of rows, columns (not necessarily 4 groups, as we can define two groups where the first two rows/columns belong to Group 0 and the next two rows/columns belong to Group 1), quadrants and quadrant-corners (as shown in FIG. 5) can be used to implement a wide variety of algorithms, although other types of grouping may be need as well.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for a plurality of processing elements in a multi-processing array to react uniquely and individually to a single control unit instruction obtained from a control unit, the control unit including a primary instruction decoder, the processing elements each including a secondary instruction decoder, said method comprising:

decoding the single control unit instruction using the primary instruction decoder in the control unit to obtain control signals corresponding to the single control unit instruction, the control signals including original instruction control signals and relevant modifier control signals, the relevant modifier control signals for a particular processing element being separately determined based upon a grouping of the particular processing element and including operation control signals and operand control signals corresponding to the grouping for the particular processing element;

sending the control signals to associated with each processing element to a corresponding secondary instruction decoder within each processing element, each secondary instruction decoder receiving the original instruction control signals and, for the particular processing element, the associated ones of the operation control signals and the operand control signals; and individually modifying the original instruction control signals sent from primary instruction decoder to each secondary instruction decoder according to the operation control signals and the operand control signals associated with each particular processing element, thereby causing each processing element to perform an operation corresponding thereto.

2. The method according to claim 1, wherein the grouping groups together certain ones of the processing elements to perform a same operation based upon at least one same single control unit instruction and same operation control signals and same operand control signals.

3. The method according to claim 2, wherein the grouping of the certain ones of the processing elements form a row.

4. The method according to claim 2, wherein the grouping of the certain ones of the processing elements form a column.

5. The method according to claim 2, wherein the grouping of the certain ones of the processing elements form an array that is a subset of the multi-processing array.

6. The method according to claim 1, wherein a sequence of the single control unit instructions are received, and each of the single control unit instructions in the sequence are operated upon using the steps of decoding, sending and individually modifying.

7. The method according to claim 6, wherein the sequence of the single control unit instructions causes the processing elements to be grouped together in a sequence of different groups, such that different groups exist within the sequence of the single control unit instructions.

8. The method according to claim 1, wherein the step of individually modifying modifies the control signals for each processing element according to a processing element serial ID number.

9. The method according to claim 1, wherein the step of individually modifying modifies the control signals for each processing element according to predetermined rules.

10. The method of claim 1, wherein said plurality of processing elements in a multi-processor array accept a single instruction as an input and perform different operations, based upon their location in the multi-processor array.

11. The method of claim 1, wherein each processing element can react differently to the same instruction according to the modification signals that said primary instruction decoder (PID) sends to each processing element.

12. A computing device comprising:

a multi-processing array, the multi-processing array including a plurality of processing elements that each react uniquely and individually to a single control unit instruction obtained from a control unit and that each include a secondary instruction decoder;

the control unit including a primary instruction decoder, wherein the single control unit instruction is decoded by the primary instruction decoder to obtain control signals corresponding to the single control unit instruction, the control signals including original instruction control signals and relevant modifier control signals, the relevant modifier control signals for a particular processing element being separately determined based upon a grouping of the particular processing element and including operation control signals and operand control signals corresponding to the grouping for the particular processing element, wherein the control signals associated with each processing element are transmitted to the corresponding secondary instruction decoder within each processing element; and wherein each secondary instruction decoder:

receives the original instruction control signals and, for the particular processing element, the associated ones of the operation control signals and the operand control signals and individually modifies the original instruction control signals sent from primary instruction decoder to each secondary instruction decoder according to the operation control signals and the operand control signals associated with each particular processing element, thereby causing each processing element to perform an operation corresponding thereto.

13. The device according to claim 12, wherein the control unit groups together certain ones of the processing elements to perform a same operation based upon at least one same single control unit instruction and same operation control signals and same operand control signals.

14. The device according to claim 13, wherein the control unit groups the certain ones of the processing elements to form a row.

15. The device according to claim 13, wherein the control unit groups the certain ones of the processing elements to form a column.

16. The device according to claim 13, wherein the control unit groups the certain ones of the processing elements to form an array that is a subset of the multi-processing array.

17. The device according to claim 12, wherein each secondary instruction decoder individually modifies the control signals for each processing element according to a processing element serial ID number.

18. The device according to claim 12, wherein each secondary instruction decoder individually modifies the control signals for each processing element according to predetermined rules.

19. The device according to claim 12, wherein said plurality of processing elements in a multi-processor array accept a single instruction as an input and perform different operations, based upon their location in the multi-processor array.

20. The device according to claim 12, wherein each processing element can react differently to the same instruction according to the modification signals that said primary instruction decoder (PID) sends to each processing element.

* * * * *